Patented Dec. 10, 1935

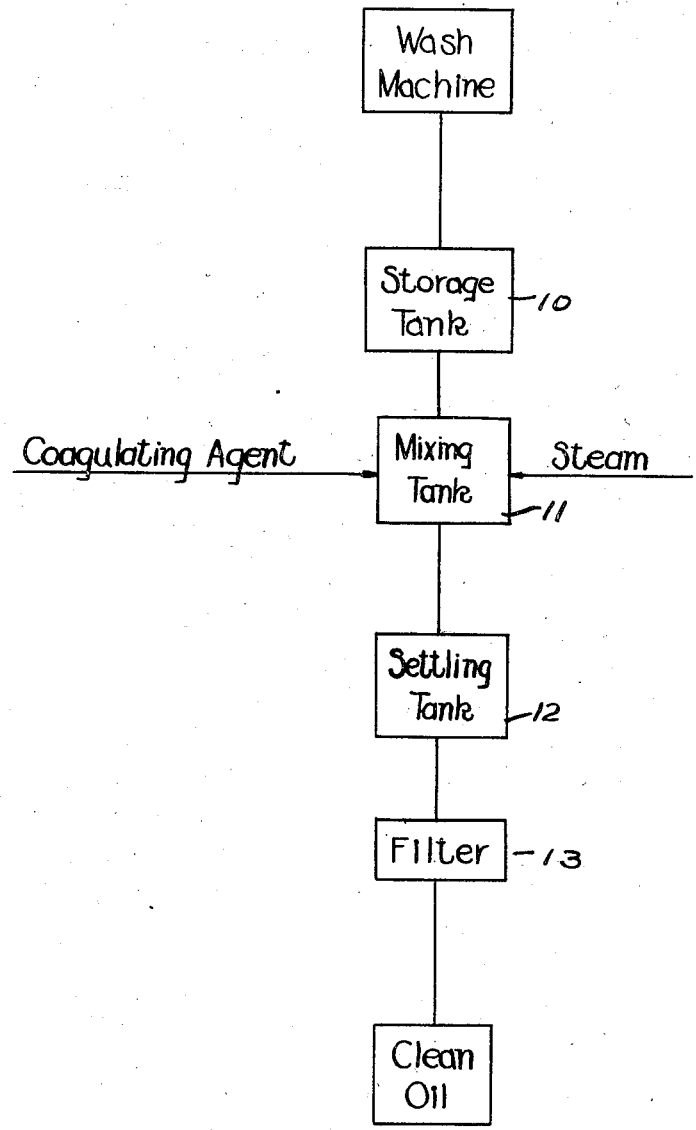

2,023,988

UNITED STATES PATENT OFFICE 2,023,988

PROCESS OF REMOVING FOREIGN MATTER FROM USED JOURNAL BOX WASTE OIL

William T. Bissell and Thomas W. Potter, Indianapolis, Ind., assignors to Journal Box Servicing Corporation, Indianapolis, Ind.

Application July 20, 1934, Serial No. 736,156

1 Claim. (Cl. 196—16)

This invention relates to a method of treating used journal box oil and more particularly to an oil in which used journal box waste has been washed. We are aware of the fact that such oil has been treated in the past by introducing chemicals so as to set up chemical reactions in the nature of oxidation. Such chemical treatment of the oil is highly objectionable for the reason that it is extremely difficult to eliminate all traces of the chemical even though the oil be thoroughly washed after treatment. The very fact that the oil must be washed to remove the treating chemical means that moisture is added to the oil which becomes objectionable when the treated oil is returned for lubricating purposes. Again any trace of the chemical remaining in the oil when coming in contact with the moisture in the oil will immediately permit that chemical to again set up some reaction and at times to produce an emulsion.

This used oil, particularly the bath oil which contains the used journal box oil, has presented a difficult problem to the industry. The oil must be renovated in some manner so as to recover the oil to prevent large loss which would arise if the oil had to be discarded.

This oil, which is the product to be worked upon in our invention, is well loaded with colloidal matter. Such matter is generally a colloidal solution of carbonates from coal, dust, and possibly in some cases, burnt lint; metallic oxides; oleates, principally lead with some iron, copper, tin, antimony, etc.; and frequently inert siliceous materials. These materials are so finely comminuted that they remain suspended in the oil in a colloidal state. There is a further contamination in the form of lint coming from the waste which remains in suspension in the oil.

The purpose of our invention is to cause a physical separation of these various contaminating materials, particularly all of the materials found in the oil other than lint, it being desirable, of course, to separate the lint at the same time the other materials are removed but the lint by itself causes no serious problem in its removal. Furthermore it is the object of our invention to cause such separation by a purely physical change without any chemical change so that there will be no necessity at any time for having to wash chemicals out of the oil nor will the danger be present of having some traces of chemical remaining in the oil which would afterwards set up reactions detrimental in effect.

The type of oil which is herein considered is that which is described in the U. S. Patent No. 1,964,326, issued June 26, 1934 to McNamara et al. and also in the pending U. S. patent application Serial No. 645,222, filed December 1, 1932 by McNamara et al. Further reference is made to the U. S. Patents Nos. 1,783,407, December 2, 1930, Conway et al., and 1,709,230, April 16, 1929, Potter et al., wherein the same type of oil is encountered.

The invention will now be described in detail with reference being made to the accompanying drawing wherein the single view is a diagrammatic representation of the process.

The contaminated oil bearing colloidal matter of such type as above indicated is for convenience accumulated in a storage tank 10. However this tank may be dispensed with in some cases and the dirty oil taken directly from the wash machine. In any event the dirty oil is in a dry state substantially free of moisture as it will be when it is taken from the wash tank in the process described in the above indicated U. S. patent application Serial No. 645,222. That is, the oil in the storage tank 10 is free of moisture. A heating and mixing tank 11 is here shown as being part of the apparatus and is interconnected with the storage tank 10 by suitable connections whereby oil may be transferred, generally by a pump, from the storage tank to the tank 11. In some cases these two tanks may be combined to be one and the same tank. Where the storage tank is employed, the oil in that tank is preferably heated to reduce the viscosity somewhat, the temperature of the oil being raised to around 120° F. or just enough to make the oil easily handled. When cold the oil is somewhat viscous and therefore requires additional work in handling. As the oil is introduced into the tank 11, sodium silicate is introduced and also a solution of sodium aluminate. Of course, these agents may be added after the entire volume of oil is placed in the tank 11 but it is easier to mix these agents with the oil as the oil is flowed therein. Six hundred (600) pounds of about 40° Baumé sodium silicate are used for each one thousand (1,000) gallons of dirty oil or in terms of gallons, using the weight of 13.02 pounds per gallon, about fifty (50) gallons of the sodium silicate are employed. For the same amount of dirty oil we employ five (5) gallons of a 20% solution in water of the sodium aluminate. In practice we employ the silicate and aluminate in combined proportion of from 3½% and up of the dirty oil. However, we find no advantage of using over 8% of these agents since the changes we desire even in the dirtiest oil encountered such as around iron mines where the ore dust sifts into the journal boxes and contaminates the oil and waste therein, an 8% solution will suffice.

After these two agents are introduced into the oil within the tank 11, steam is introduced into the bottom of the tank and allowed to escape therein to pass up through the oil to agitate it and to heat it. Pressure is allowed to build up in the tank to around fifteen (15) pounds so that the temperature of the oil may be brought up to around 240° F. This temperature is maintained for about an hour. The contents of the tank 11 are then transferred to a settling tank 12 as indicated in the diagram although where sufficient capacity is available and the oil is not required to be treated in frequent batches, the tank 12 may be dispensed with and the settling operation allowed to take place in the tank 11. In either event, the oil is allowed to cool and remain undisturbed for about twelve (12) hours although a longer period may be employed where time is not important. The twelve hour period is indicated since the oil may be allowed to stand over-night. Following the settling period, the oil is pumped from the top of the settling tank 12 down to the sludge which is found in the bottom of the tank and which has settled from the oil. From the settling tank, this top oil is conveyed to a filter 13, preferably of the type as shown and described in the U. S. Patent No. 1,964,326.

The sodium silicate and sodium aluminate are employed to produce coagulation without any chemical reaction on the oil or foreign matter in the oil. The agents employed do not oxidize any of the matter and particularly the organic matter. The purpose of coagulation is to break down the colloidal state so as to transform the state from colloidal to a flocculent one so as to release the foreign matter and permit it to precipitate. This flocculent state is brought about by the sodium silicate in the presence of the sodium aluminate. The precipitate at the bottom of the settling tank where the precipitation is allowed to occur undisturbed is found to be a viscous, tarry substance. As this flocculent material precipitates, it carries down with it quite a bit of the lint in the oil. In fact it has been observed that where the precipitation is allowed to occur and be carried on undisturbed for a number of days, the oil above the precipitate is apparently absolutely free of lint as well as of the foreign matter.

Metal bases have a stronger affinity for solid articles. Sodium silicate and sodium aluminate both are salts of metal bases and are of a rather inactive group. Thus these ingredients added to the dirty oil would have an affinity for the solid particles in the oil. A very thorough mixing of the ingredients with the oil is essential to get these ingredients into contact with the comminuted solids entrapped in the oil. Now as the oil mixture is heated, the oil itself tends to become less viscous while the silicate tends to become more viscous so that the sodium silicate as it thickens will adhere to the solids in the oil and drag those solids downwardly through the oil which has had its viscosity lowered by heat. The picture of the process can be likened to an innumerable group of magnets tending to pull the solids out of the oil, the magnets being the base salts which are added, particularly the sodium silicate which has the mechanical action of actually thickening to adhere to the foreign particles in the presence of heat.

The oil pumped or conducted from the settling tank 12 is noticeably free of foreign matter and is passed through the filter 13 so as to remove the lint. Some of the foreign matter will also be filtered out which has not as yet had time to precipitate and the oil, when drawn from the filter, is then ready for use, having as good at least, an analysis as the original lubricating oil.

It is to be particularly noted that in the foregoing process, there is nothing left in the oil taken from the settling tank 12 which requires that the oil be washed so that no moisture is introduced in an attempt to free the oil of injurious chemicals. There is no chemical left in the oil since the sodium silicate and sodium aluminate will precipitate and be found in the sludge in the bottom of the tank 12. As above indicated, where chemicals are employed to bring about chemical reactions with organic matter in the oils and break down emulsions (the oil herein being considered being free of moisture hence free of emulsion) must be washed out of the oil by water. Such chemicals may be carried in the oil in the form of colloidal salts and therefore are difficult to remove and then later when the colloidal state is broken down will attract moisture and then become active to produce damage in the bearing wherein the oil is to be used.

These chemicals are either highly acid or caustic in nature and are used to decompose the foreign matter found in the oil so as to form salts. Such salts as formed are soluble only in water and hence water must be employed to dissolve them and carry them out of that oil. It is repeated that in our process, we do not desire decomposition but instead merely cause the added ingredients, particularly the sodium silicate to thicken about the foreign particles so as to cause them to precipitate in the thinned oil.

The precipitate or sludge remaining on the bottom of the settling tank 12 contains some oil since about 70 to 80% of the oil is pumped or conducted from the settling tank above the sludge. After this upper or clear oil has been removed, water is added to the settling tank in a volume equal to that of the sludge and steam is introduced through the sludge to agitate and to bring the sludge and water up to the boiling point of water. After thoroughly agitating, the mass is allowed to settle for some time so that the oil may float to the top and the sludge settle. There are then three distinct layers in the tank, oil at the top, water thereunder, and sludge under the water. The oil is taken from the top above the water and the water and sludge drained out of the bottom of the tank and discarded. The oil taken from the top is passed through the filter 13 as before indicated. The sludge and water taken from the settling tank after the oil has been removed therefrom is interesting in that when allowed to stand exposed to the atmosphere and the water allowed to drain or evaporate therefrom, the resultant product when dried is a rather hard, gray, substance easily crumbled, and the lint particles are readily observable throughout it.

The fact that the water separates so easily from the oil when the sludge is treated is ample evidence of the fact that no chemical reaction has taken place since there are no soaps or emulsions formed when the mixture of water and sludge is cooked up by the introduced steam. The dried sludge is absolutely free from any traces of oil and the water itself is clearly separated from the oil.

The only reason for adding the water to the sludge is to bring about a mechanical separation of the oil from sludge so as to float the oil thereout.

While we have herein described our invention in one particular form, it is obvious that deviations in the several steps outlined and in the apparatus employed may be had without departing from the spirit of the invention, and we, therefore, do not desire to be limited to that precise form beyond the limitations as may be imposed by the following claim.

We claim:

That process of removing finely divided suspended foreign matter from used journal box waste oil, which consists of adding about 600 pounds of sodium silicate and about five gallons of a 20 per cent water solution of sodium aluminate to about one thousand gallons of dirty oil, the combined proportion of the silicate and aluminate ranging from 3½ to 8 per cent of the oil, agitating and heating the oil and chemical mixture to above 212° F., and then allowing a precipitate to form.

WILLIAM T. BISSELL.
THOMAS W. POTTER.